(12) United States Patent
Hauptenbuchner et al.

(10) Patent No.: US 9,725,002 B2
(45) Date of Patent: Aug. 8, 2017

(54) CHARGING DEVICE FOR CHARGING AN ELECTRIC VEHICLE AT A CHARGING STATION

(71) Applicant: Kostal Kontakt Systeme GmbH, Luedenscheid (DE)

(72) Inventors: Siegfried Hauptenbuchner, Halver (DE); Thomas Scherer, Luedenscheid (DE); Georg Schroeder, Drolshagen (DE); Matthias Schubert, Luedenscheid (DE); Joerg Welschholz, Herscheid (DE); Roland Drees, Boenen (DE)

(73) Assignee: Kostal Kontakt Systeme GmbH, Luedenscheid (DE)

( * ) Notice: Subject to any disclaimer, the term of this patent is extended or adjusted under 35 U.S.C. 154(b) by 379 days.

(21) Appl. No.: 14/677,034

(22) Filed: Apr. 2, 2015

(65) Prior Publication Data
US 2015/0210176 A1 Jul. 30, 2015

Related U.S. Application Data

(63) Continuation of application No. PCT/EP2013/071901, filed on Oct. 18, 2013.

(30) Foreign Application Priority Data

Oct. 22, 2012 (DE) .......... 10 2012 020 592

(51) Int. Cl.
*H02J 7/00* (2006.01)
*B60L 11/18* (2006.01)
(Continued)

(52) U.S. Cl.
CPC ....... *B60L 11/1816* (2013.01); *B60L 11/1818* (2013.01); *B60L 11/1827* (2013.01);
(Continued)

(58) Field of Classification Search
CPC ............ B60L 11/1816; B60L 11/1827; H01R 13/193; H02J 7/025; H02J 17/00
(Continued)

(56) References Cited

U.S. PATENT DOCUMENTS 9,368,008 B2* 6/2016 Jefferies ............. G08B 13/1418
2012/0091958 A1 4/2012 Ichikawa et al.

FOREIGN PATENT DOCUMENTS

DE 1270644 B 6/1968
DE 102009010120 A1 9/2010
(Continued)

OTHER PUBLICATIONS

European Patent Office, International Search Report for the corresponding International Application No. PCT/EP2013/071901 mailed Jul. 22, 2014.
(Continued)

*Primary Examiner* — Edward Tso
*Assistant Examiner* — Aaron Piggush
(74) *Attorney, Agent, or Firm* — Brooks Kushman P.C.

(57) ABSTRACT

A charging system for charging an electric vehicle at a charging station includes a charge module at the charging station and a charge module at the vehicle. The charge modules include electric contact elements which can be interconnected together. The charging system includes an automatic positioning device configured to move the charging station charge module relative to the vehicle charge module to align and join the charge modules together. The charging system includes an automatic feed device configured to enable the contact elements of the charging station charge module to connect to the contact elements of the vehicle charge module when the charge modules are joined together. The contact elements of the charge modules are configured such that the contact elements can connect to each other without overriding a contact force.

17 Claims, 4 Drawing Sheets

(51) Int. Cl.
  *H01R 13/193*    (2006.01)
  *H01R 13/631*    (2006.01)
  *H02J 7/02*      (2016.01)
  *H02J 17/00*     (2006.01)
  *H01R 13/453*    (2006.01)

(52) U.S. Cl.
  CPC ....... *H01R 13/193* (2013.01); *H01R 13/6315* (2013.01); *H02J 7/025* (2013.01); *H02J 17/00* (2013.01); *H01M 2220/20* (2013.01); *H01R 13/4534* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
  USPC .......................................... 320/107, 109, 113
  See application file for complete search history.

(56) References Cited

FOREIGN PATENT DOCUMENTS

| DE | 102010044091 A1 | 5/2012 |
| DE | 102010062513 A1 | 6/2012 |
| DE | 202012003577 U1 | 6/2012 |

OTHER PUBLICATIONS

The International Bureau of WIPO, International Preliminary Report on Patentability for International Application No. PCT/EP2013/071901 mailed May 7, 2015.

\* cited by examiner

Fig. 5
Fig. 6
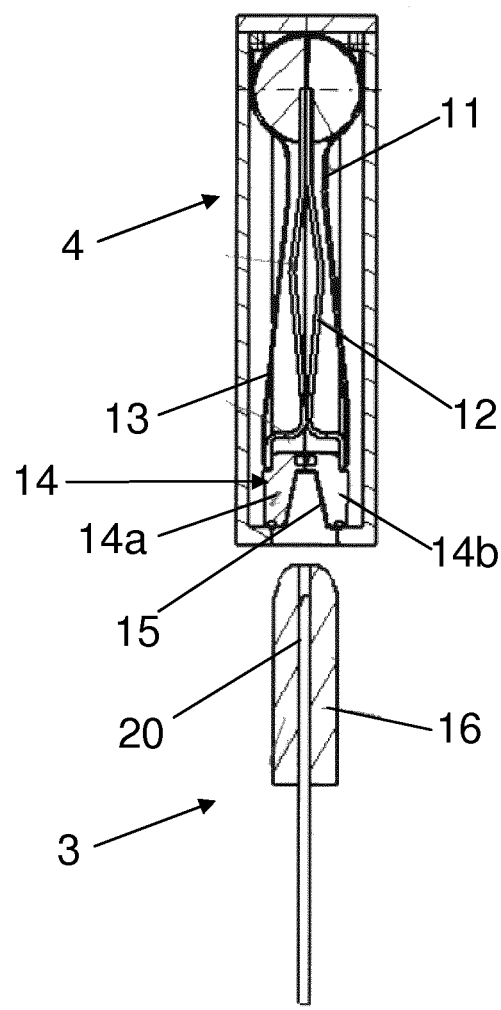
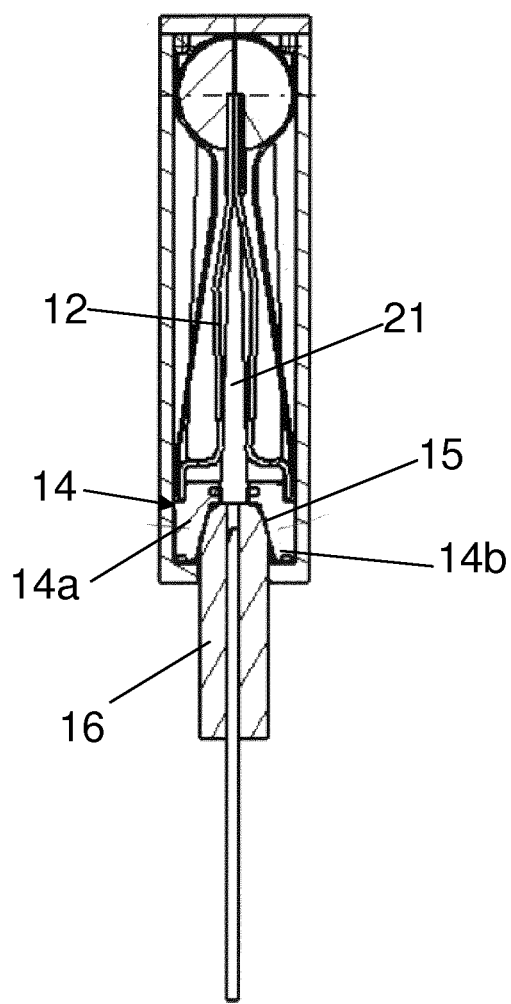

CHARGING DEVICE FOR CHARGING AN ELECTRIC VEHICLE AT A CHARGING STATION

CROSS-REFERENCE TO RELATED APPLICATIONS

This application is a continuation of International Application No. PCT/EP2013/071901, published in German, with an International filing date of Oct. 18, 2013, which claims priority to DE 10 2012 020 592.9, filed Oct. 22, 2012, the disclosures of which are hereby incorporated in their entirety by reference herein.

TECHNICAL FIELD

The present invention relates to a charging system for charging an electric vehicle at a charging station, the charging system having a first charge module at the charging station, a second charge module at the vehicle, an automatic positioning device at the charging station for attaching the first charge module to the second charge module, and an automatic feed device at the charging station whose activation allows electrical contact elements of the first charge module to be connected to electrical contact elements of the second charge module when the charge modules are attached to one another.

BACKGROUND

DE 20 2012 003577 A1 describes a charging system such as described in the above Technical Field.

The traction battery of an electric vehicle can be recharged at a charging station via integrated contact assemblies which conduct charge current through electrical conductors and a connector assembly in the vehicle. The fraction battery can also be recharged at a charging station via contactless assemblies which inductively transmit charge current from a transformer coil at the charging station to a transformer coil of the vehicle.

Inductive charging devices enable convenient charging since no mutual physical connection of electrical contacts need to be made, and the transformer coils which are to be moved to approach one another can be positioned by automated mechanisms.

Directly connected charging devices are economical in their operation since they have higher efficiency and correspondingly smaller losses as compared to inductive charging devices. Directly connected charging devices have a simple design and are thus cost effective. A disadvantage is that electrical contact elements have to be physically joined to one another, which is generally carried out by manually connecting plug connector components.

DE 10 2009 010 120 A1 describes a charging system having an automated feed device for making the connection between electrical contact elements of the charge module at the charging station and electrical contact elements of the charge module at the electric vehicle. In this charging system, the vehicle has to be positioned precisely with respect to the charging station so that the contact elements of the charge modules can be brought together. DE 10 2009 010 120 A1 describes that the vehicle can be arranged on a conveyor belt to move longitudinally and transversely (similar to the situation in an automatic car wash) and be automatically brought into a position in which its contact elements lie opposite the mating contact elements of the charging station. Optical means may be used to aid in the positioning.

DE 10 2009 010 120 A1 describes end sections of bar-shaped contact elements of the charging station charge module being formed with a vaulted cross section allowing them to impinge upon slanted insertion surfaces of the contact elements of the vehicle charge module. The contact elements of the charging station charge module are not completely rigid, but instead are elastic enough so that they can also impinge on the mating contact elements of the vehicle charge module by undergoing small lateral deflections in the contacting direction.

In general, practical implementation of a charging system with motor driven electrical contact elements is not without problems. The connection of contact elements by machines requires precise knowledge of the positions of the contact elements to be connected, precise mechanical alignment of the contact elements with respect to one another, a "finely tuned" action during the connection and separation processes of the contact elements, and prevention of damage or wear to the contact elements. Care must be taken to assure that the contact elements are precisely aligned with one another during the connection process so that they do not jam. A charging system fulfilling these requirements is usually accompanied by significant technical effort and high cost.

SUMMARY

An object of the present invention is a charging device or system ("charging system") for charging an electric vehicle at a charging station in which the charging system features a relatively simple and cost-effective design and enables a secure and especially low wear connection of electrical contact elements of a charge module at the charging station with electrical contact elements of a charge module at the vehicle.

In carrying out at least one of the above and/or other objects, an electric vehicle charging system includes first and second charge modules. The first charge module has a first electrical contact element including a guide sleeve slidable along a contact pin. The second charge module has a second electrical contact element including contact plates coupled together by a spring. A distance of the contact plates between one another depends on a contact force of the spring. The contact force depends on a position of the spring. A position of the guide sleeve with respect to the second contact element affects the position of the spring and thereby affects the distance of the contact plates between one another such that the contact pin can be inserted between the contact plates without friction when the charge modules are joined together.

The second contact element may further include a contact carrier having a chamfer connected to the spring. In this case, when the guide sleeve is engaged into the chamfer the position of the spring is such that the spring generates a contact force which pushes the contact plates apart from one another thereby forming an intermediate space between the contact plates for receiving the contact pin therein without friction. Correspondingly, when the guide sleeve is disengaged from the chamfer the position of the spring is such that the spring generates a contact force which is insufficient for pushing the contact plates apart from one another thereby enclosing the intermediate space between the contact plates.

Further, in carrying out at least one of the above and/or other objects, a charging system for charging an electric vehicle at a charging station is provided. The charging system includes a first charge module of a charging station and a second charge module of an electric vehicle. The first charge module has a first electrical contact element including a contact pin and a guide sleeve. The guide sleeve is slidable along a contact pin. The second charge module has a second electrical contact element including contact plates, a spring, and a contact carrier. The contact plates ae coupled together by the spring and the spring is coupled to the contact carrier. A distance of the contact plates between one another depends on a contact force of the spring. The contact force depends on a position of the spring. The position of the spring depends on a position of the contact carrier. A position of the guide sleeve along the contact pin with respect to the second contact element affects the position of the contact carrier thereby affecting the position of the spring and the distance of the contact plates between one another such that the contact pin can be inserted between the contact plates without friction when the charge modules are joined together.

An embodiment provides a charging system for charging an electric vehicle at a charging station. The charging system includes a charge module at the charging station and a charge module at the vehicle. The charge modules include electric contact elements. The contacts elements of the charge modules can be interconnected together. The charging system further includes an automatic positioning device and an automatic feed device. The automatic positioning device is configured to move the charging station charge module relative to the vehicle charge module to align and join the charge modules together. The automatic feed device is configured to enable the contact elements of the charging station charge module to connect to the contact elements of the vehicle charge module when the charge modules are joined together. The contact elements of the charge modules are configured such that the contact elements can be connected to each other without overriding a contact force.

In embodiments, the electric contact elements of a first charge module at a charging station and the electric contact elements of a second charge module at an electric vehicle can be attached without overcoming a contact force between themselves. The contact elements can be attached together without overcoming a contact force between themselves as the contact elements have the following characteristics. One or more of the contact elements ("a first contact element") of the first charge module at the charging station has a contact pin and a guide sleeve. The guide sleeve can be slid against the contact pin by an actuator. One or more of the corresponding contact elements ("a second contact element") of the second charge module at the vehicle has two contact surfaces that are coupled by a spring. The distance of the contact surfaces from one another can be changed by the force of the spring. The position of the guide sleeve of the first contact element with respect to the second contact element affects the position of the spring that determines the contact force.

Whereas DE 10 2009 010 120 A1 describes only a charging system with motor-actuated contact elements, a charging system in accordance with the embodiments also provides that the charge modules containing the contact elements be made so that they can be positioned with respect to one another. In addition, the contact elements of the charge modules can be mutually connected without excessive contact forces. Only after the contact elements are brought together do mechanically released springs produce contact forces between the contact elements.

The resulting automatic joining process of the contact elements is especially simple and secure. Force-free joining reduces contact wear and the risk of damage, such as by jamming the contact elements. However, high contact forces can be produced at the end of the joining process, which assures a good electrical connection between the charge modules.

Precise positioning of the charge modules with respect to one another can be facilitated by centering means or/and by positioning elements on at least one of the charge modules.

BRIEF DESCRIPTION OF THE DRAWINGS

FIGS. 5, 6, 7, and 8 illustrate respective phases during connection of an electrical contact element of the first charge module to an electrical contact element of the second charge module when the charge modules are fully joined together.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1, 2, 3, and 4, a charging system for charging an electric vehicle at a charging station is shown. The charging system includes a first charge module 1 and a second charge module 2. First charge module 1 is at the charging station and second charge module 2 is at the vehicle. As such, first charge module 1 is a charging station-side charge module and second charge module 2 is a vehicle-side charge module. Second charge module 2 has the form of a cassette and is arranged to the body of the vehicle. Possible mounting locations include the area behind the front bumper such as behind the license plate and at the bottom of the vehicle.

Figure 1:
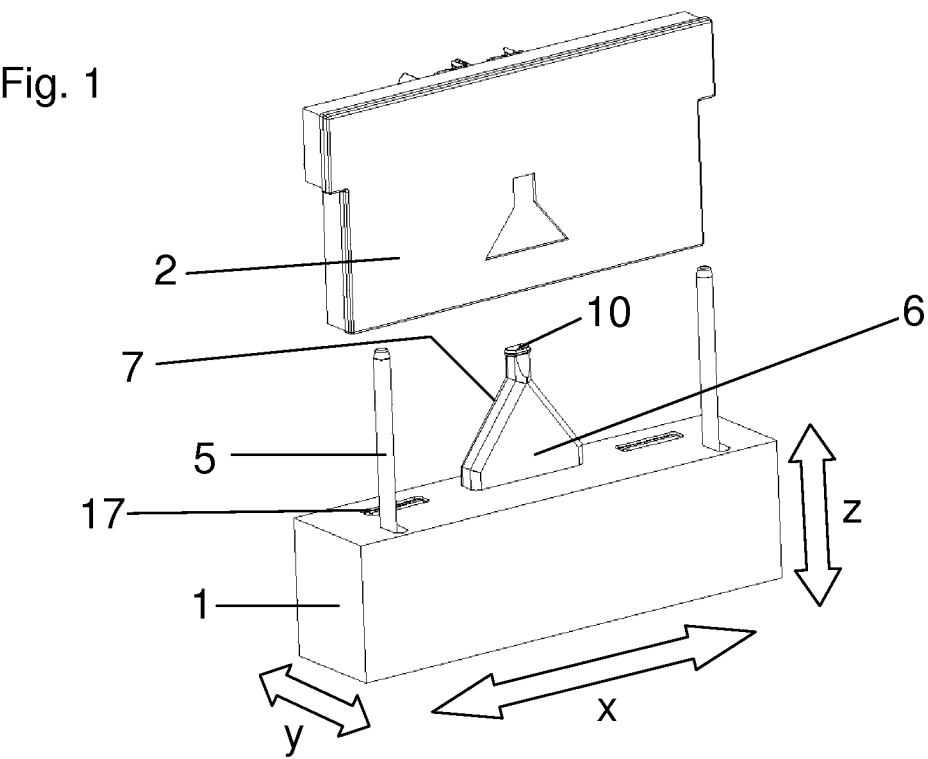
FIG. 1 illustrates a charging system for charging an electric vehicle, the charging system having a first charge module at a charging station and a second charge module at the vehicle.

Electrical current can conduct from the charging station to the vehicle via first and second charge modules 1 and 2 when the charge modules are joined to one another. In FIG. 1 and in FIG. 2, charge modules 1 and 2 are disconnected and apart from one another. In FIG. 3, charge modules 1 and 2 are partially joined to one another. In FIG. 4, charge modules 1 and 2 are fully joined to one another.

An automatic positioning device (not shown) of the charging station is configured to move first charge module 1 in three mutually perpendicular x, y, z directions. As such, first charge module 1 can be moved and aligned relative to second charge module 2 in order to join or separate the first charge module to/from the second charge module. The automatic positioning device may employ a camera sensor for monitoring the position of first charge module 1 relative to second charge module 2. Second charge module 2 may include camera targets recognizable by the camera sensor for the automatic positioning device to use in moving first charge module 1 relative to the second charge module. The automatic positioning device may include multi-axis actuators implemented as, for example, a robot arm configured to move first charge module 1.

FIGS. 1, 2, 3, and 4 depict first and second charge modules 1 and 2 being joined together in a vertical direction. Of course, charge modules 1 and 2 can alternatively be aligned to one another such that the joining takes place in a horizontal or any other arbitrary direction.

First charge module 1 includes a set of electric contact elements including first electric contact element 3 shown in FIGS. 5, 6, 7, and 8. Second charge module 2 includes a corresponding set of electric contact elements including second electric contact element 4 shown in FIGS. 5, 6, 7, and 8. The contact elements of first charge module 1 can connect to respective contact elements of second charge module 2 when the charge modules are joined together. For instance, as shown in FIGS. 5, 6, 7, and 8, first contact element 3 can connect to second contact element 4 when charge modules 1 and 2 are joined together.

As shown in FIGS. 1, 2, 3, and 4, first charge module 1 includes a pair of pole-shaped positioning members 5. Positioning members 5 are for use in aligning first charge module 1 to second charge module 2 so that the charge modules can be properly joined. Positioning members 5 may be respectively connected to a force sensor or switch in the housing of first charge module 1. When charge modules 1 and 2 are aligned parallel to one another the housing of second charge module 2 touches positioning members 5 about the same time as the first charge module is being moved toward the second charge module. The distance between positioning members 5 is almost the same as the length of the housing of second charge module 2. As such, simultaneous activation of positioning members 5 caused by the housing of second charge module 2 touching the positioning members ensures that the second charge module is oriented in the x-direction approximately centered relative to first charge module 1. Therefore, the joining of charge modules 1 and 2 can be initiated.

As shown in FIGS. 1, 2, 3, and 4, first charge module 1 further includes a centering member 6. Centering member 6 is also for use in aligning first charge module 1 to second charge module 2 so that the charge modules can be properly joined. Centering member 6 is configured to provide a more accurate alignment of charge modules 1 and 2 as the charge modules are joined together. Centering member 6 is protruding body having a tip 10 and a pair of inclined bearing surfaces 7. As such, for instance, centering member 6 has a triangular shape as shown in FIGS. 1, 2, 3, and 4. Alternatively, centering member 6 may be provided as a centering cone-shaped body, for example.

Figure 2:
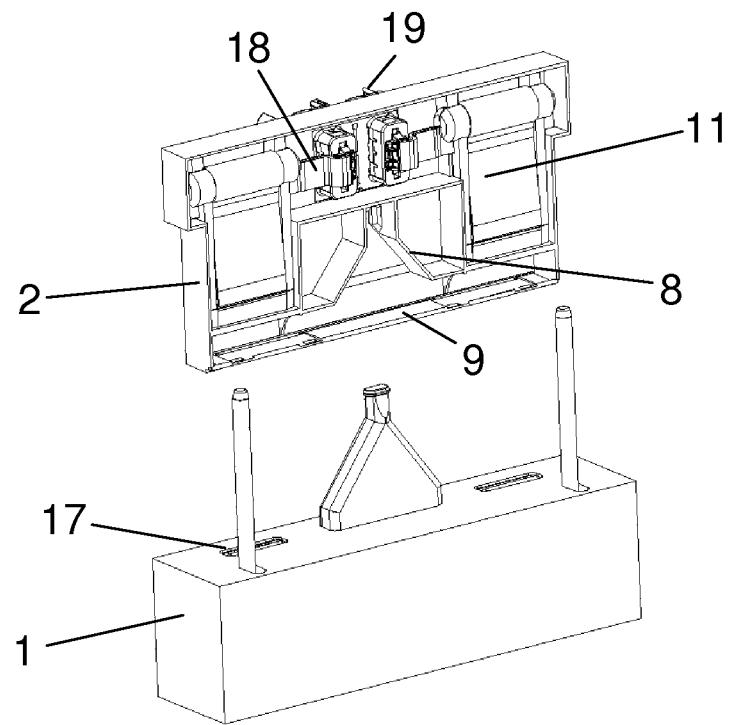
FIG. 2 illustrates the charging system with the charge modules apart from one another with a cut-away version of the second charge module being shown for illustrative purposes.
Figure 3:
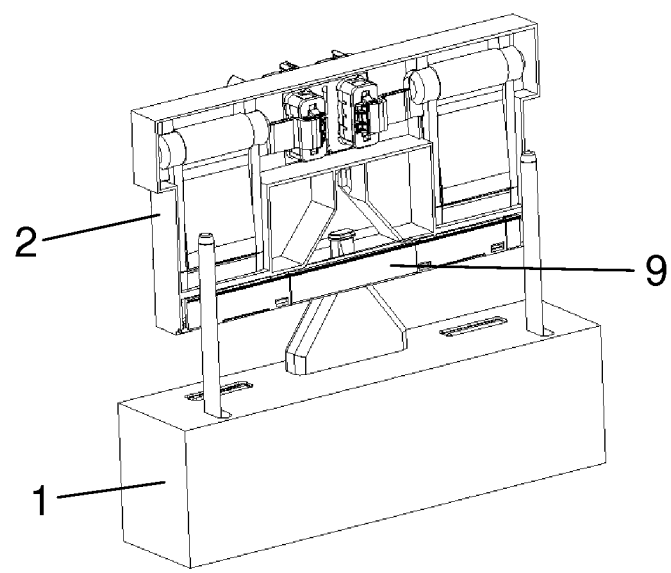
FIG. 3 illustrates the charging system with the charge modules partially joined together with the cut-away version of the second charge module being shown.
Figure 4:
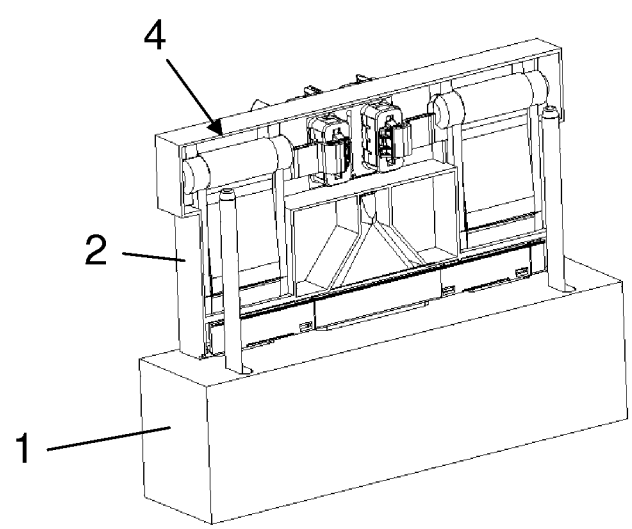
FIG. 4 illustrates the charging system with the charge modules fully joined together with the cut-away version of the second charge module being shown.

As shown in FIGS. 2, 3, and 4, second charge module 2 includes a pair of guide ribs 8. Guide ribs 8 are integrally formed within the housing of second charge module 2. Guide ribs 8 respectively correspond to inclined bearing surfaces 7 of centering member 6. During the joining process of first and second charge modules 1 and 2, bearing surfaces 7 come to rest respectively against guide ribs 8.

First and second charge modules 1 and 2 are thus aligned during their joining firstly by positioning members 5 in the y-direction and secondly by centering member 6 and guide ribs 8 in the x-direction. The approach of charge modules 1 and 2 in the z-direction towards one another takes place relative to each other also by the positioning and can be supported in particular by an optical sensor.

As shown in FIGS. 2, 3 and 4, the housing of second charge module 2 has a damper 9. Damper 9 opens automatically upon tip 10 of centering member 6 of first charge module 1 touching the damper. Tip 10 of centering member 6 touches damper 9 when first charge module 1 is moved in the z-direction toward second charge module 2 causing the centering member to press against the damper. Damper 9 thereby opens automatically when first charge module 1 becomes partially joined to second charge module 2.

At the end of the joining process, charge modules 1 and 2 are fully joined together as shown in FIG. 4. In the last step, charge modules 1 and 2 are mechanically interlocked with each other. This can be done by tip 10 of centering member 6 of first charge module 1 connecting to a latch opening of second charge module 2 (at the top of guide webs 8) in a positive manner. Charge modules 1 and 2 are thus precisely aligned and mechanically fixed to each other.

The positioning, aligning, and locking of charge modules 1 and 2 together occurs without mechanical influence or interaction of the contact elements of the charge modules. The joined charge modules 1 and 2 allow the contact elements of the first charge module to connect to the contact elements of the second charge module. The contact element connection process is not compromised as charge modules 1 and 2 are prevented from moving or sliding relative to each other while the charge modules are joined.

As shown in FIGS. 1, 2, and 3, first charge module 1 further includes a pair of contact openings 17. The contact elements of first charge module 1 are extendable out from contact openings 17 by a motor drive.

As shown in FIGS. 1, 2, and 3, the contact elements (e.g., second contact element 4) of second charge module 2 are arranged in the housing of the second charge module. The contact elements of second charge module 2 each have on an outer surface a spring 11. Spring 11 is configured to produce a contact force. The contact elements of second charge module 2 in each case are associated with a metal strip 18. Metal strips 18 form electric terminals on an outer surface of second charge module 2. Electric terminals 19 connect to the traction battery system of the electric vehicle.

Referring now to FIGS. 5, 6, 7, and 8, with continual reference to FIGS. 1, 2, 3, and 4, respective connection phases of first contact element 3 of first charge module 1 to second contact element 4 of second charge module 2 when the charge modules are fully joined together are shown. These connection phases do not correspond to the charge module joining phases illustrated in FIGS. 1, 2, 3, and 4. The connection of contact elements 3 and 4 begins only when charge modules 1 and 2 are completely joined as shown in FIG. 4.

FIGS. 5, 6, 7, and 8 each show a sectional view through second charge module 2 along second contact element 4 and first contact element 3 of first charge module 1 connectable to the second contact element. Details of first charge module 1 are not shown in FIGS. 5, 6, 7, and 8.

Also not shown in FIGS. 5, 6, 7, and 8 is the automatic feed device at the charging station. The automatic feed device is an actuator system for moving or feeding the contact elements of first charge module 1 to the contact elements of second charge module 2. The automatic feed device has electromotive, electromagnetic, hydraulic, or pneumatic components configured to move or feed the contact elements of first charge module 1. The automatic feed device further includes a control system configured to fully automatically control the moving or feeding components.

Second contact element 4 of second charge module 2 includes spring 11 enclosed by a pair of adjacently arranged contact plates 12. Spring has spring legs 13. End portions of spring legs 13 and contact plates 12 are connected to a contact carrier 14. Contact carrier 14 includes first and second contact carrier parts 14a and 14b. Contact carrier parts 14a and 14b include sloped portions or chamfers 15 which diverge from spring legs 13 towards the outside of second contact element 4.

First contact element 3 of first charge module 1 includes a flat connector or contact pin 20 and a guide sleeve 16. Guide sleeve 16 surrounds at least a portion of the perimeter of a portion of connector 20. Guide sleeve 16 is slidable along connector 20 such that the guide sleeve and/or the connector can be longitudinally displaced relative to one another. Guide sleeve 16 can be positioned by an actuator in the direction of second contact element 4 whereby first and second contact elements 3 and 4 can be connected together or separated from one another. The connection of contact elements 3 and 4 takes place in the phases shown in FIGS. 5, 6, 7, and 8.

In FIG. 5, first and second contact element 3 and 4 are not yet connected to each other. At the beginning of the connection process, connector 20 and guide sleeve 16 of first contact element 3 are moved together in the direction of second contact element 4. The free end portion of connector 20 is surrounded by guide sleeve 16.

In the following phase shown in FIG. 6, guide sleeve 20 of first contact element 3 meets chamfers 15 of first and second contact carrier parts 14a and 14b of second contact element 4 and presses the carrier parts apart. As a result, spring legs 13 associated with contact carrier 14 are pushed apart which causes the pair of contact plates 12 to be pushed apart. The pushing apart of contact plates 12 forms an intermediate space 21 between the contact plates as shown in FIG. 6.

Figure 7:
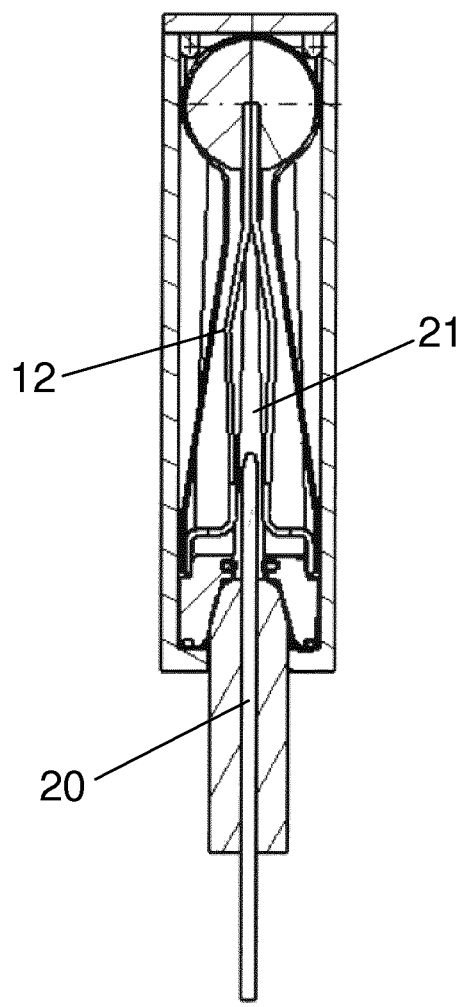

As shown in FIG. 7, contact plates 12 are pushed far enough away from one another such that connector 20 can be inserted into intermediate space 21 between the contact plates without friction. As a result, contact elements 3 and 4 can be joined to each other without overriding a contact force. That is, in this way, the contact elements of first charge module 1 can be joined to the contact elements of second charge module 2 without overriding a contact force. No contact force between contact plates 12 bears down on connector 20 during the insertion of the connector into intermediate space 21. Accordingly, no mechanical wear by friction between contact elements 3 and 4 is formed.

Figure 8:
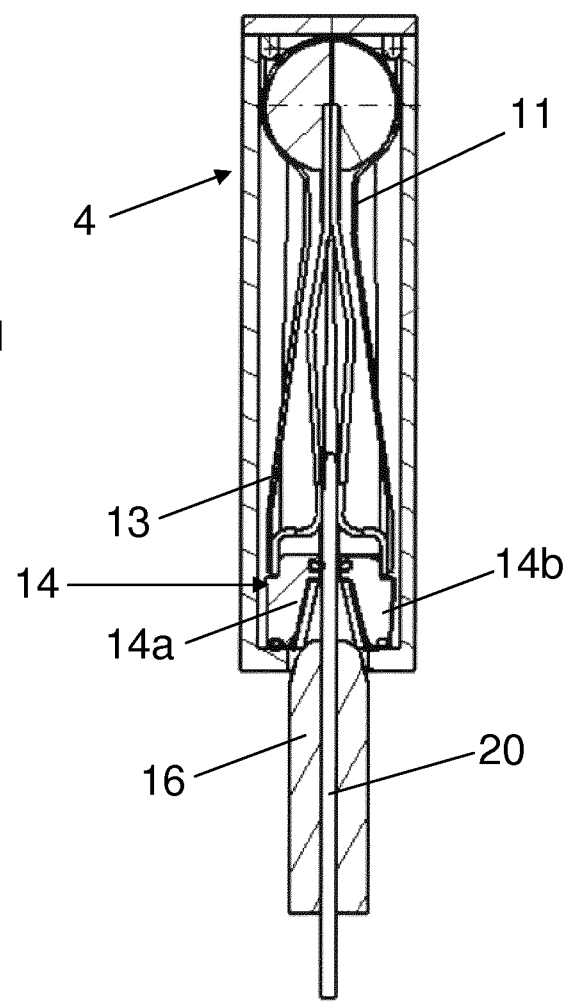

A contact force from contact plates 12 is generated onto connector 20 when the connector has reached its intended terminal position. As shown in FIG. 8, the contact force from contact plates 12 generated onto connector 20 is achieved due to displacement of guide sleeve 16 away from second contact element 4. In particular, guide sleeve 16 is displaced along connector 20 away from contact carrier parts 14a and 14b. Due to the absence of guide sleeve 16 from chamfers 15 of contact carrier parts 14a and 14b, spring legs 13 press the contact carrier parts towards each other. This causes contact plates 12 to be pushed together thereby closing intermediate space 21 with the end portion of connector 20 locked therein.

The separation of the electrical components of contact elements 3 and 4 can be carried out without friction, in which case the process flow shown in FIGS. 5, 6, 7, and 8 is reversed.

REFERENCE NUMERAL LIST 1 first charge module of charging station
2 second charge module of vehicle
3 electric contact elements of first charge module
4 electric contact elements of second charge module
5 positioning members
6 centering member
7 bearing surfaces of centering member
8 guide ribs
6, 8 centering means
9 cap
10 tip of centering member
11 spring
12 contact plates
13 spring legs
14 contact carrier
14a, 14b contact carrier parts
15 chamfers
16 guide sleeve
17 contact openings
18 metal strips
19 electric terminals
20 flat connector (contact pin)
21 intermediate space x, y, z directions (spatial axes)

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric vehicle charging system comprising:
a first charge module having a first electrical contact element including a guide sleeve slidable along a contact pin;
a second charge module having a second electrical contact element including contact plates coupled together by a spring, wherein a distance of the contact plates between one another depends on a contact force of the spring and the contact force depends on a position of the spring; and
wherein a position of the guide sleeve with respect to the second contact element affects the position of the spring and thereby affects the distance of the contact plates between one another such that the contact pin can be inserted between the contact plates without friction when the charge modules are joined together.

2. The system of claim 1 wherein:
the first and second charge modules are joined together in a form fitting manner after being joined by a latch that can be actuated.

3. The system of claim 1 wherein:
the first and second charge modules further include interacting centering members for enabling the charge modules to be joined together.

4. The system of claim 3 wherein:
the first charge module further includes positioning members for enabling the first and second charge modules to be joined together.

5. The system of claim 1 wherein:
the contact pin is a flat connector pin.

6. The system of claim 1 wherein:
the second charge module further includes a protective cap that closes a housing of the second charge module, wherein the protective cap opens upon the first charge module being joined to the second charge module.

7. The system of claim 1 wherein:
the first charge module is of a charging station and the second charge module is of an electric vehicle.

8. The system of claim 1 wherein:
a position of the first charge module relative to the second charge module to join the charge modules together is performed using an automatic positioning device.

9. The system of claim 8 wherein:
the position of the first charge module relative to the second charge module is movable along three mutually perpendicular spatial axes (x, y, z).

10. The system of claim 1 wherein:
the first contact element is fed from the first charge module upon activation of an automatic feed device when the charge modules are joined together to enable the first contact element to be connected to the second contact element.

11. The system of claim 1 wherein:
the second contact element further includes a contact carrier having a chamfer connected to the spring, wherein when the guide sleeve is engaged into the chamfer the position of the spring is such that the spring generates a contact force which pushes the contact plates apart from one another thereby forming an intermediate space between the contact plates for receiving the contact pin therein without friction.

12. The system of claim 11 wherein:
when the guide sleeve is disengaged from the chamfer the position of the spring is such that the spring generates a contact force which is insufficient for pushing the contact plates apart from one another thereby enclosing the intermediate space between the contact plates.

13. A charging system for charging an electric vehicle at a charging station, the charging system comprising:
a first charge module of a charging station, the first charge module having a first electrical contact element including a contact pin and a guide sleeve, wherein the guide sleeve is slidable along a contact pin;
a second charge module of an electric vehicle, the second charge module having a second electrical contact element including contact plates, a spring, and a contact carrier, wherein the contact plates are coupled together by the spring and the spring is coupled to the contact carrier, a distance of the contact plates between one another depends on a contact force of the spring, the contact force depends on a position of the spring, and the position of the spring depends on a position of the contact carrier; and
wherein a position of the guide sleeve along the contact pin with respect to the second contact element affects the position of the contact carrier thereby affecting the position of the spring and the distance of the contact plates between one another such that the contact pin can be inserted between the contact plates without friction when the charge modules are joined together.

14. The system of claim 13 wherein:
a position of the first charge module relative to the second charge module to join the charge modules together is performed using an automatic positioning device at the charging station.

15. The system of claim 13 wherein:
the first contact element is fed from the first charge module upon activation of an automatic feed device at the charging station when the charge modules are joined together to enable the first contact element to be connected to the second contact element.

16. The system of claim 13 wherein:
when the guide sleeve engages the contact carrier the position of the spring is such that the spring generates a contact force which pushes the contact plates apart from one another thereby forming an intermediate space between the contact plates for receiving the contact pin therein without friction.

17. The system of claim 16 wherein:
when the guide sleeve is disengaged from the contact carrier the position of the spring is such that the spring generates a contact force which is insufficient for pushing the contact plates apart from one another thereby enclosing the intermediate space between the contact plates.

* * * * *